(12) United States Patent
Angiolillo et al.

(10) Patent No.: US 9,154,842 B2
(45) Date of Patent: Oct. 6, 2015

(54) METHOD AND SYSTEM FOR CUSTOMIZABLE VIDEO PLAYBACK CONTROLS

(75) Inventors: Joel S. Angiolillo, Weston, MA (US); Robert Virzi, Wayland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2197 days.

(21) Appl. No.: 11/555,749

(22) Filed: Nov. 2, 2006

(65) Prior Publication Data

US 2008/0107402 A1    May 8, 2008

(51) Int. Cl.
  *H04N 5/783*    (2006.01)
  *H04N 21/472*   (2011.01)
  *H04N 5/44*     (2011.01)
  *H04N 21/422*   (2011.01)
  *H04N 19/44*    (2014.01)

(52) U.S. Cl.
  CPC ....... *H04N 21/47217* (2013.01); *H04N 5/4403* (2013.01); *H04N 19/44* (2014.11); *H04N 21/42204* (2013.01)

(58) Field of Classification Search
  CPC ....................... H04N 5/4403; H04N 21/42204
  USPC ............ 386/46, 52, 68–70, 83, 124–126, 343
  See application file for complete search history.

(56) References Cited

U.S. PATENT DOCUMENTS

| 6,075,919 | A  | * | 6/2000  | Omoto et al. ................. 386/314 |
| 6,684,026 | B2 | * | 1/2004  | Kanota et al. ................. 386/333 |
| 6,850,691 | B1 | * | 2/2005  | Stam et al. .................... 386/350 |
| 6,865,336 | B2 | * | 3/2005  | Johnson ........................ 386/291 |
| 7,127,152 | B2 | * | 10/2006 | Van Den Enden .............. 386/68 |
| 7,502,544 | B2 | * | 3/2009  | Takemoto ..................... 386/343 |
| 2004/0105660 | A1 | * | 6/2004 | Suzuki ............................ 386/95 |
| 2006/0078297 | A1 | * | 4/2006 | Nishikawa et al. ............. 386/69 |
| 2008/0131071 | A1 | * | 6/2008 | Ogikubo ........................ 386/46 |

FOREIGN PATENT DOCUMENTS

WO    WO 2004/014073    *    2/2004

* cited by examiner

*Primary Examiner* — David Harvey

(57) ABSTRACT

Embodiments of the present disclosure are directed to a method and system comprising a remote control device, an output device, and a media control station that receives an initiating command from the remote control device to initiate a forward function or a backward function, provides a display at the output device in response to the initiating command, receives a user selection command based on the display, and adjusts the function based on the user selection commands.

19 Claims, 11 Drawing Sheets

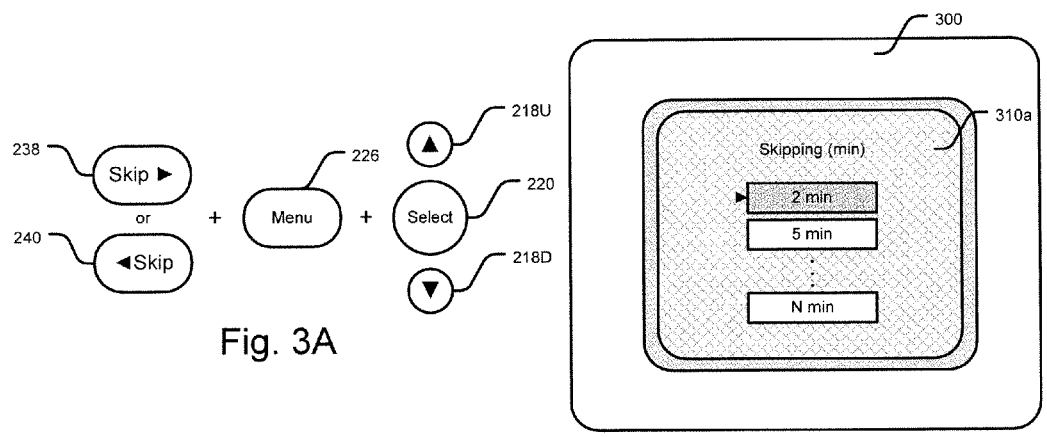
Fig. 3A
Fig. 3B
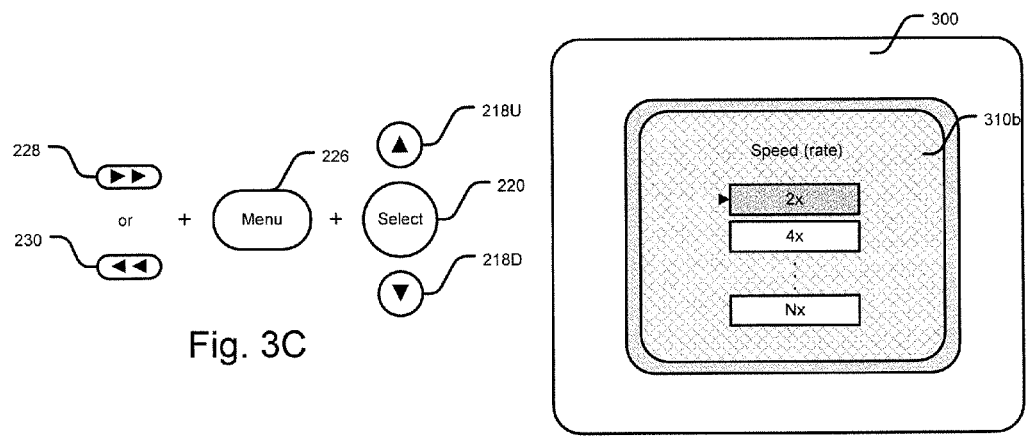
Fig. 3C
Fig. 3D

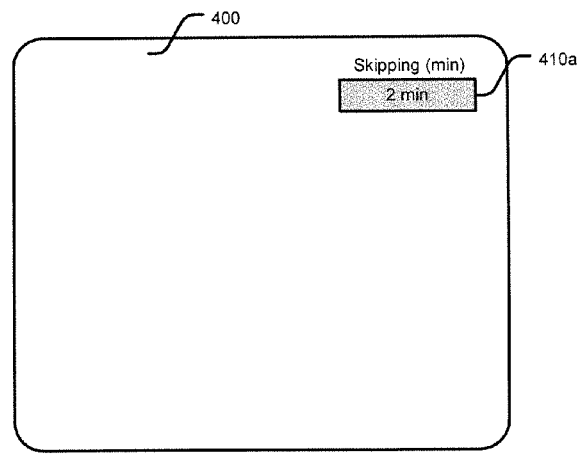
Fig. 4B
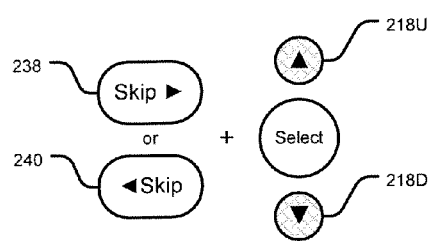
Fig. 4A
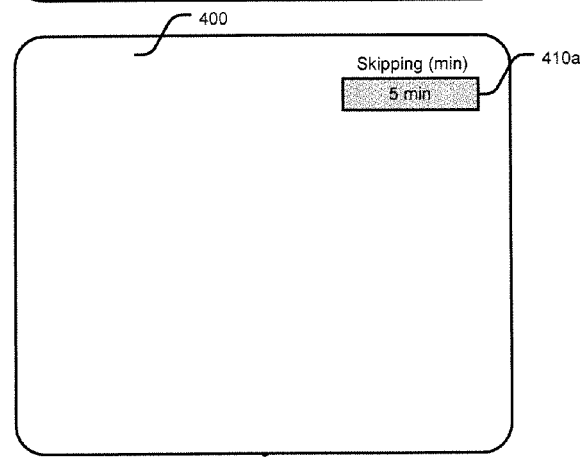
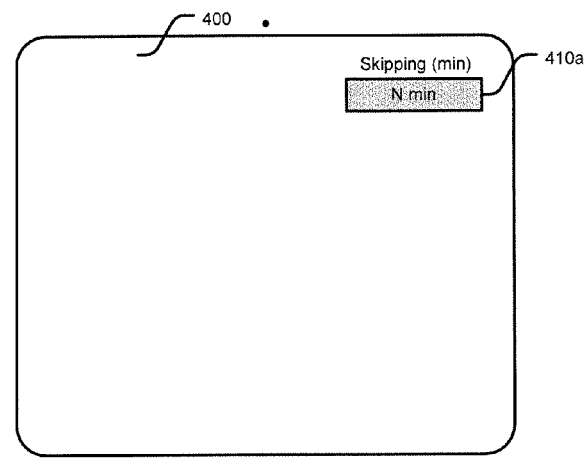

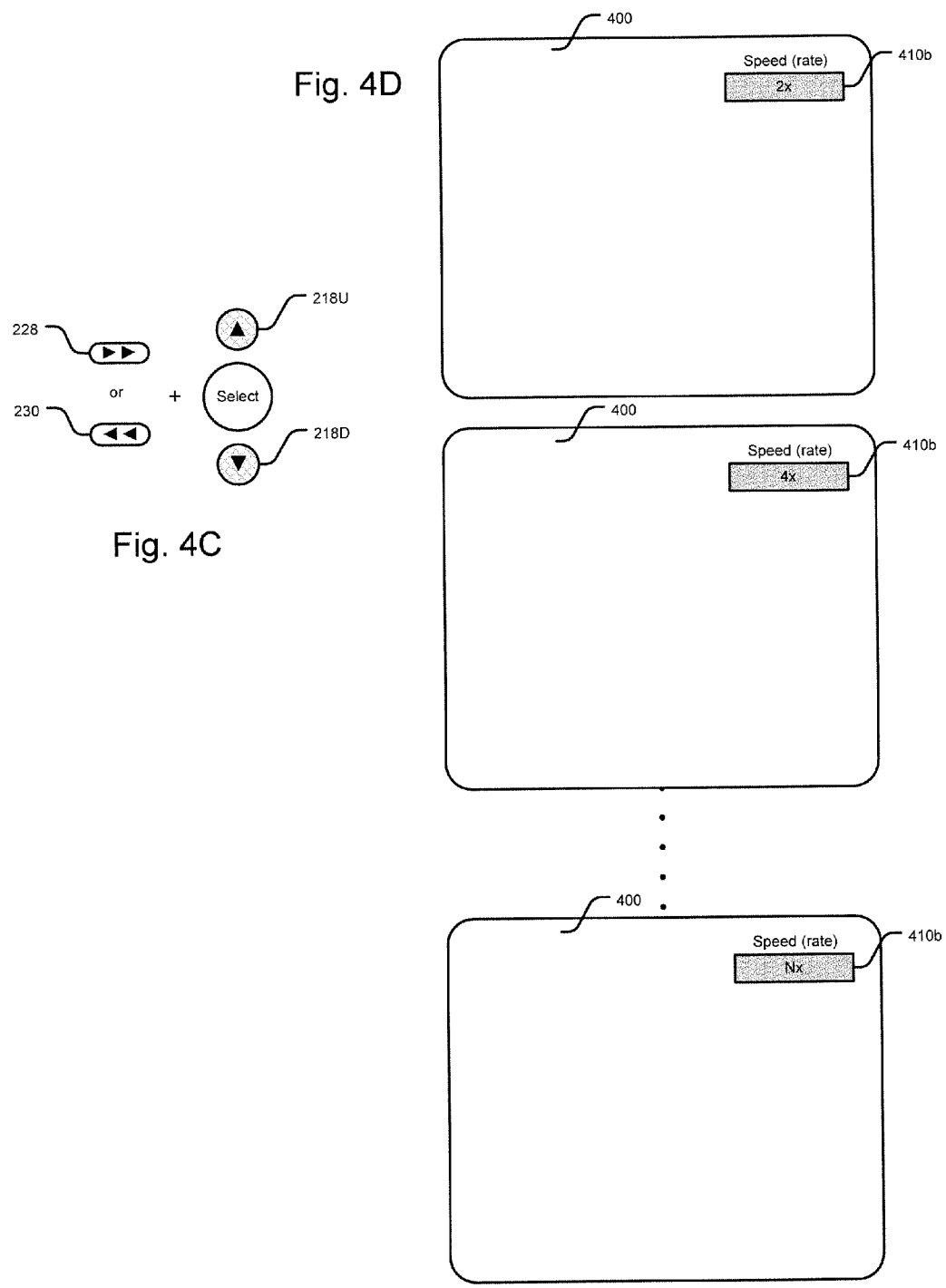

METHOD AND SYSTEM FOR CUSTOMIZABLE VIDEO PLAYBACK CONTROLS

BACKGROUND INFORMATION

Multimedia devices, such as VCRs (Video Cassette Recorders), DVD (Digital Video Disc) players, CD players, and MP3 players, are extremely popular with consumers. More recently, Digital Video Recorders (DVRs), also called Personal Video Recorders (PVRs), have become another option for people to record and watch video. Consumer VCRs typically provided a few basic playback controls, such as Play, Stop, Pause, Rewind, and Fast Forward. DVD players added a few more capabilities, such as several levels of rewind and fast forward speeds. Because DVRs use a hard drive-based storage medium for recording video, additional playback control features may be added. These may include features such as Skip Back (a single jump back in video) and Skip Forward (a single jump forward in video), Slow Motion (moving backward at a lower speed), Frame Advance (moving forward one frame at a time), and Frame Back (moving backward one frame at a time). As a result, video playback controls have become increasingly complex in order to accommodate additional functionalities and features.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIGS. 3A-3E depict an exemplary illustration of playback controls, according to an embodiment of the disclosure.

FIGS. 4A-4D depict an exemplary illustration of playback controls, according to an embodiment of the disclosure.

DETAILED DESCRIPTION OF EMBODIMENTS

A system and process of an exemplary embodiment of the disclosure provides various customizable video playback features. TV and movie watching are no longer a "start-to-end linear" experience. Viewers, who want more control over their experience, may frequently jump around in the video stream to enhance their viewing experience. However, with all the various options and/or buttons, a viewer may find video playback controls too complex to remember and use.

Figure 1:
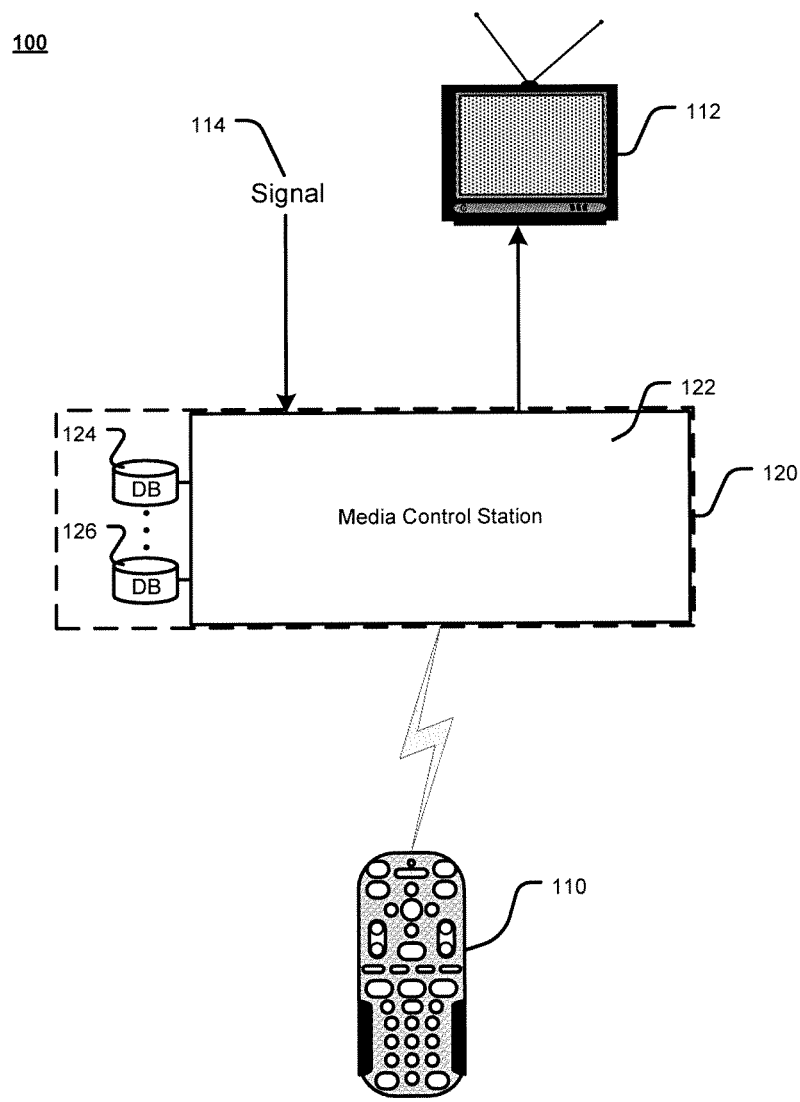
FIG. 1 depicts an exemplary illustration of a system architecture, according to an embodiment of the disclosure.

FIG. 1 depicts an exemplary a system, according to an embodiment of the disclosure. System 100 may comprise a remote control 110, a media box 120, and an output device 112, such as a TV, monitor, or other similar device. Media box 120 may include a media control station 122 and one or more databases 124, 126. Media control station 122 may include at least an input to receive one or more commands from the remote control device 110, an input to receive a signal 114 for streaming media, and an output to transmit media to the output device 112. Other variations and components, such as a viewer interface, additional inputs/outputs, etc., may also be provided.

Figure 2:
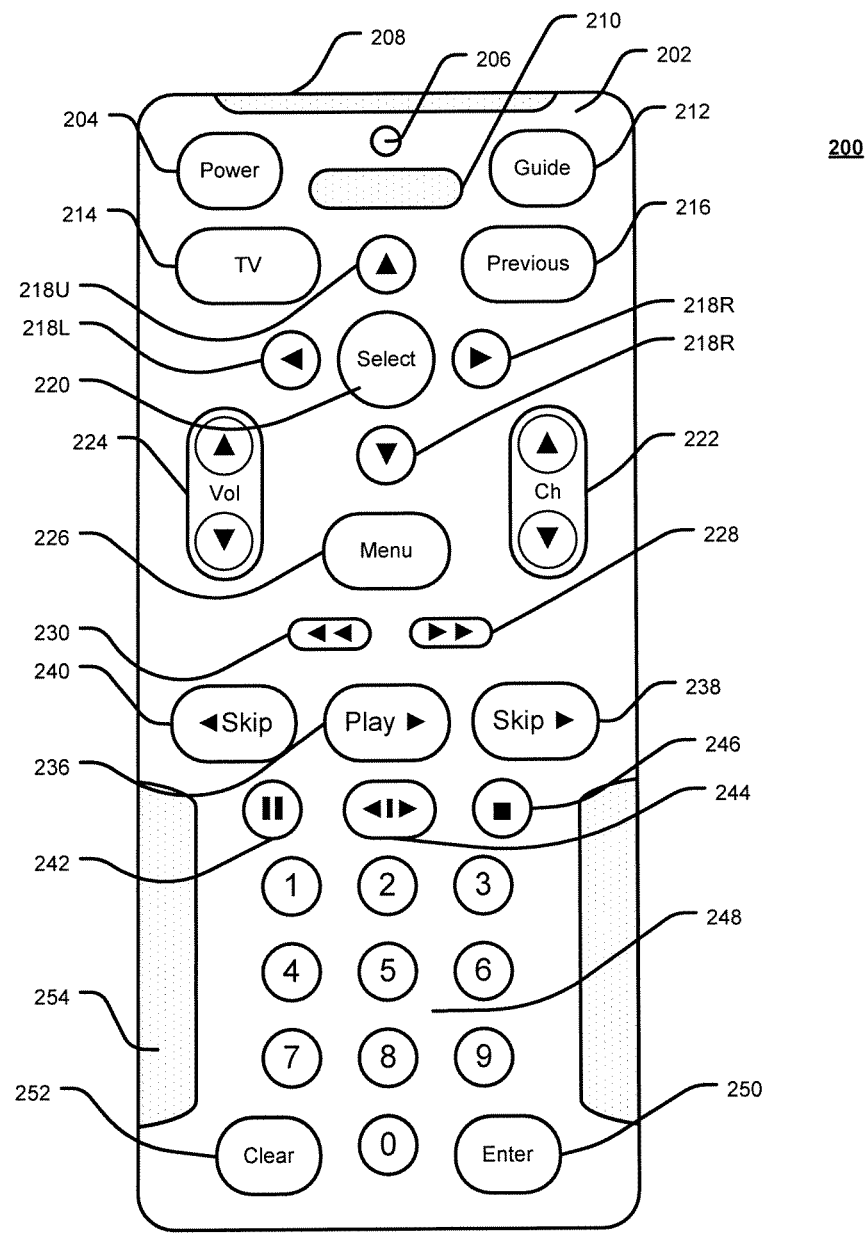
FIG. 2 depicts an exemplary illustration of a remote control device, according to an embodiment of the disclosure.

FIG. 2 depicts an exemplary illustration of frontal view 200 of a remote control device 110, according to an embodiment of the disclosure. While specifics of a wireless remote control device are discussed below, it should be appreciated that embodiments of the disclosure are applicable to a variety of remote control devices. As such, embodiments of the disclosure may provide custom controls for video playback independent of any particular remote control technology.

Remote control device 110 may include a body or frame 202, a wireless output 208, an light indicator 206, a logo area 210, gripping pads 254, and variety of buttons 204, 212-250 on the face of the remote control 200 for a user/viewer to input one or more commands.

The body 202 may be formed of various types of materials and in a variety of shapes. In one embodiment, the body 202 may have a rectangular shape with rounded corners. Other shapes, such as a curvier shape for improved gripping, may also be provided. In another embodiment, the body 202 may be made of a plastic or metal material. Other various materials, such as hard rubber or other similar material, may also be used.

The remote control device 110 may send user commands to the media control station 122 at the media box 120 via the wireless output 208. The wireless output 208 may include a variety of wireless signaling pathways, such as infrared, Bluetooth™, local area wireless network (e.g., 802.11 based protocols), and/or other similar signaling applications. In one embodiment, the remote control device 110 may have a wired output, e.g., a game pad controller. Other various embodiments may also be provided.

A number of buttons may exist on the face 200 of a remote control 110. Power button 204 may be used by a viewer to turn on or off the media box 120. Power button 204 may also be used as a universal control to turn on other devices, such as the output device 112 and/or other peripheral devices. Light indicator 206 may be of one color (e.g., green) when the power is on. Light indicator 206 may blink or emit light of another color when other buttons are pressed to indicate, for example, signal transmission. Guide button 212 may be used to view a menu or index of media. TV button 214 may be pressed to switch from various modes of output channels, such as TV, Video 1, Video 2, Component, Auxiliary, etc. "Previous" button 216 may be used by a viewer to repeat a previous action. Arrows 218U, 218R, 218R, 218L may be used to maneuver menu options. Select button 220 may be used to select menu options. In one embodiment, the arrows may be on one ring-shaped button to include diagonal-pointing arrows. Volume button 224 may be used to control the level of volume from the media box 120 to the output device 112. Channel button 222 may be used to flip and/or scroll through channels in ascending or descending order. Menu button 226 may be used to display a menu of options. Fast Forward button 228 may be used to perform fast forwarding functions at predetermined speeds. Rewind button 230 may be used to perform rewind or reverse progression functions at predetermined speeds. Skip Forward 238 and Skip Back button 240 may be used to initiate and perform customizable skip forward and skip back features, respectively. Play button 236 may be used to initiate and execute playback. Pause 242 may be used to pause playback at any given frame. Stop 246 may be used to stop playback at any given frame. Slow Motion button 244 may be used to move forward or backward frame by frame within a particular media stream. Alphanumeric Keypad 248 may be used to enter alphanumerical information and/or commands. Enter 250 may be used to select menu features and/or submit an alphanumeric entry. Clear 252 may be used to reset a viewing feature or erase an alphanumeric entry.

It should be appreciated by one of ordinary skill in the art that remote control devices come in a variety of shapes, sizes, textures, and functionalities with an assortment of buttons and/or labels. Additionally, remote control devices may use various technologies (e.g., wired or wireless technologies) to communicate with external devices.

Video playback controls, as discussed above, may offer a number of preset speeds by which a user/viewer may perform a fast forward or rewind function. Embodiments of the disclosure may expand the limited number of preset speeds by providing several customizable video playback features. These may generally include a quick set customization, customization using key modifiers, and customization using context keys. Each of these customizations will be discussed in further detail below. Furthermore, methods for modifying and/or altering functions of a particular key or button, e.g., fast forward to skip forward, may also be provided in order to supply additional flexibility and improved customization.

A quick set customization may be provided to a user in a variety of ways. FIGS. 3A-3E depict an exemplary illustration of playback controls, according to an embodiment of the disclosure. A user may initiate a forward function (e.g., a skip forward and/or fast forward) or a backward function (e.g., skip back and/or rewind) by sending an initiating command from a remote control 110 to the media box 120, specifically at the media control station 122. Once the media box 120 receives and processes the user's initiating command, the media control station 122 may wait for additional user commands.

In one embodiment, for example, as depicted in FIG. 3A, a user may press the Skip Forward button 238 on the remote control 110 to initiate a skip forward function and then immediately press the Menu button 226 to send a menu command. Alternatively, in another embodiment, a menu command may be sent without pressing the Menu button 226. Once the commands are received, the media box 120 may output a menu 310a of predetermined intervals for the viewer to choose from. FIG. 3B depicts an exemplary screenshot of a video broadcast 300 displaying a menu 310a on the output device 112. The viewer may use arrows, e.g., up 218U and/or down 218D, and the Select button 220 to select the skipping interval by which he or she desires to jump forward in the video broadcast 300. Alternatively, in another embodiment, the skipping interval may be selected without pressing the Select button 220 but by allowing the arrow indicator to sit at the desired speed for a predetermined period of time, e.g. one second. Once the viewer chooses the interval, a selecting command may be sent to the media box 120 to skip forward in the video at the selected interval. In this example, skipping intervals may be in an amount of time to be skipped, e.g., 2 minutes, 5 minutes, . . . N minutes, where N represent an integer. For instance, if a viewer selects an interval of 5 minutes from the menu 310a and then presses Play 236, the television broadcast may skip forward 5 minutes down the broadcast and resume play at that position. In one embodiment, it may not be necessary for a viewer to press Play 236; automatic playback may be implemented once the speed (amount of minutes) is selected. Other variations may also be provided.

In another embodiment, for example, as depicted in FIG. 3C, a user may press the Fast Forward button 228 on the remote control 110 to initiate a fast forward function and then immediately press the Menu button 226 to send a menu command. Alternatively, in another embodiment, a menu command may be sent without pressing the Menu button 226. Once the commands are received, the media box 120 may output a menu 310b of predetermined playback speeds for the viewer to choose from. FIG. 3D depicts an exemplary screenshot of a video broadcast 300 displaying a menu 310b on the output device 112. The viewer may use arrows, e.g., up 218U and/or down 218D, and the Select button 220 to select the speed by which he or she desires to fast forward in the video broadcast 300. Alternatively, in another embodiment, the speed may be selected without pressing the Select button 220 but by allowing the arrow indicator to sit at the desired speed for a predetermined period of time, e.g., one second. Once the viewer chooses the playback speed, a selecting command may be sent to the media box 120 to fast forward the video at the selected playback speed. In this example, rates of the fast forward or rewind speed may be displayed, e.g., 2×, 4×, . . . N×, where N represents an integer. Once the speed is chosen, the video broadcast 300 may fast forward at the selected rate until the viewer resumes play by pressing Play 236. For instance, if a viewer selects a fast forward speed of 4× from the menu 310a and then presses Play 236, the television broadcast may fast forward at 4 times the normal playback (1×) speed for the period of time between the user's playback speed selection and pressing the Play button 236. Other variations may also be provided.

While common playback speeds may range anywhere from 0.25× to 400× (where 0.5 (slow motion), 1.0 (normal play), 3×, 30×, and 60× may be most popular), it should be appreciated by one of ordinary skill in the art that playback speeds may be continuously variable. For example, a user may select speeds such as 43× or 64×, for example, and may do so while remaining in fast forward or rewind mode. This feature may be particularly useful, for example, for a user to rapidly fast forward through one section of a video broadcast 400 and then slow down as one is nearing the end of the section desired to be skipped to avoid "overshooting," which may be problematic when fast forwarding and rewinding at high rates.

Figure 3E:
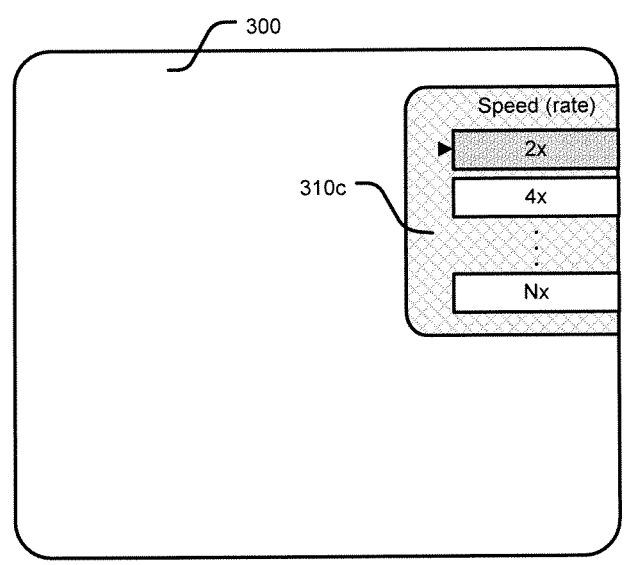

As depicted in FIG. 3E, the menu 310c of predetermined speeds may also be of varying sizes and may be positioned at various locations on the video screen 300. In this example, the menu 310c is a small menu positioned at a periphery (e.g., upper right-hand corner) of the screen 300 to provide the user a better view of the video to determine the rate of performing the fast forward and/or rewind function. Other variations may also be provided.

In one embodiment, the list of predetermined skip intervals or playback speeds may be customizable to include a few intervals or speeds. In another embodiment, the list may be more comprehensive. In another embodiment, the user may use the Up and Down Arrows 218U, 218D to select the desired jump interval or playback speed. In yet another embodiment, the list may be preceded by at least an alphanumeric digit where the user may enter the digit in the remote control device 110 to make his or her selection. Other various embodiments may also be provided.

FIGS. 4A-4D depict another exemplary illustration of a quick set customization of playback controls, according to an embodiment of the disclosure. In FIG. 4A, a user may press the Skip Forward 238 or Skip Back 240 buttons on the remote control 110 to initiate a skip forward or skip back function, respectively. In this example, a current jump interval indicator 410a may be provided on the video screen 400, as depicted in FIG. 4B. The viewer may change the interval by pressing arrows, e.g., Up 218U and/or Down 218D, and the Select button 220 to select the interval by which he or she desires to skip forward or skip back. At every press of the arrows, the current interval indicator may either increase or decrease. Once the viewer sees and chooses the interval, a selecting command may be sent to the media control station 122 at the media box 120 to skip forward or skip back at the selected interval. In this example, the skipping interval may be in an amount of minutes to be skipped, e.g., 2 minutes, 5 minutes, . . . N minutes, where N represents an integer. Alternatively, in another embodiment, the jump interval may be selected without pressing the Select button 220 but by allowing the arrow indicator to sit at the desired speed for a predetermined period of time. Other various embodiments may also be provided.

In another embodiment, for example, as depicted in FIG. 4C, a user may press the Fast Forward 228 or Rewind 230 buttons on the remote control 110 to initiate a fast forward or rewind function, respectively. In this example, a current playback speed indicator 410b may be provided on the video screen 400, as depicted in FIG. 4D. The video 400 may begin fast forwarding at a default rate, e.g., at 2× the normal speed. The viewer may change the speed by pressing arrows, e.g., Up 218U and/or Down 218D, and the Select button 220 to select the speed by which he or she desires to fast forward or rewind. At every press of the arrows, the current speed indicator may either increase or decrease. Once the viewer sees and chooses the speed, a selecting command may be sent to the media control station 122 at the media box 120 to perform the forward and/or backward function (e.g., a skip forward or skip back function) at the selected speed. The playback speed may be, for example, 2×, 4×, . . . N×, where N represents and integer. Other various embodiments may also be provided.

Figure 5A:
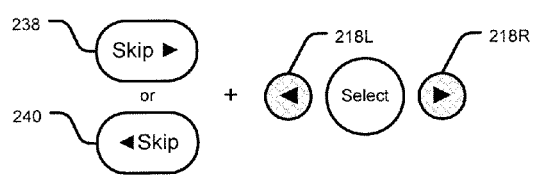
FIGS. 5A-5D depict an exemplary illustration of playback controls, according to an embodiment of the disclosure.
Figure 5B:
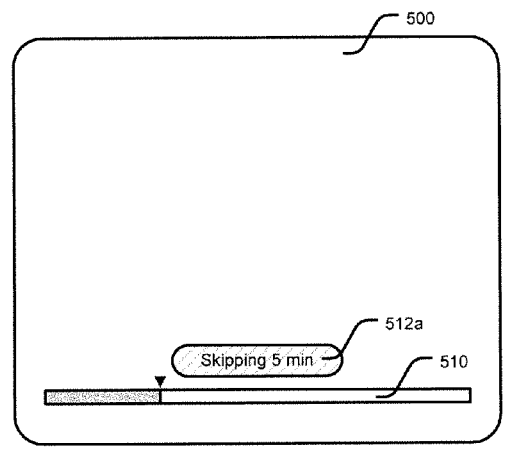

FIGS. 5A-5D depict another exemplary illustration of a quick set customization of playback controls, according to an embodiment of the disclosure. In FIG. 5A, a user may press the Skip Forward 238 or the Skip Back 240 button on the remote control 110 to jump forward or jump back, respectively, in the video broadcast 500. In this example, a sliding bar 510 may be provided to indicate the current jump interval within a range of intervals, as depicted in FIG. 5B. At every press of the arrows, the slider position indicator (e.g., an arrowhead and/or color-fill in the slider) may move to the right (increase skipping interval) or to the left (decrease skipping interval). In one embodiment, a current interval indicator 512a may also be provided to display the corresponding interval at the slider position indicator. Once the viewer sees and chooses the desired skipping interval, a selecting command may be sent to the media control station 122 at the media box 120 to perform the fast forward and/or rewind function at the selected speed. In this example, the skipping interval may be in an amount of minutes to be skipped, e.g., 2 minutes, 5 minutes, . . . N minutes, where N represents an integer. Alternatively, in another embodiment, the skipping interval may be selected without pressing the Select button 220 but by allowing the slider position indicator to sit at the desired interval for a predetermined period of time. Other various embodiments may also be provided.

Figure 5C:
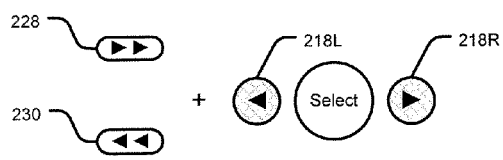
Figure 5D:
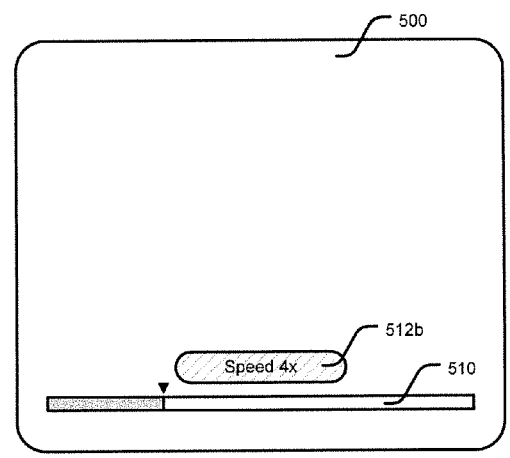

In another embodiment, for example, as depicted in FIG. 5C, a user may press the Fast Forward 228 or the Rewind 230 button on the remote control 110 to fast forward or rewind, respectively, in the video broadcast 500. In this example, similar to FIGS. 5A-5B, a sliding bar 510 may be provided to indicate the current playback speed within a range of speeds, as depicted in FIG. 5D. At every press of the arrows, the slider position indicator (e.g., an arrowhead and/or color-fill in the slider) may move to the right (increase speed) or to the left (decrease speed). In one embodiment, a current speed indicator 512a may also be provided to display the corresponding speed at the slider position indicator. Once the viewer sees and chooses the desired speed, a selecting command may be sent to the media control station 122 at the media box 120 to perform the fast forward and/or rewind function at the selected speed. In this example, the playback speed may be in an amount of minutes to be skipped, e.g., 2 minutes, 5 minutes, . . . N minutes, where N represents an integer. Alternatively, in another embodiment, the speed may be selected without pressing the Select button 220 but by allowing the slider position indicator to sit at the desired speed for a predetermined period of time. Other various embodiments may also be provided.

Figure 6A:
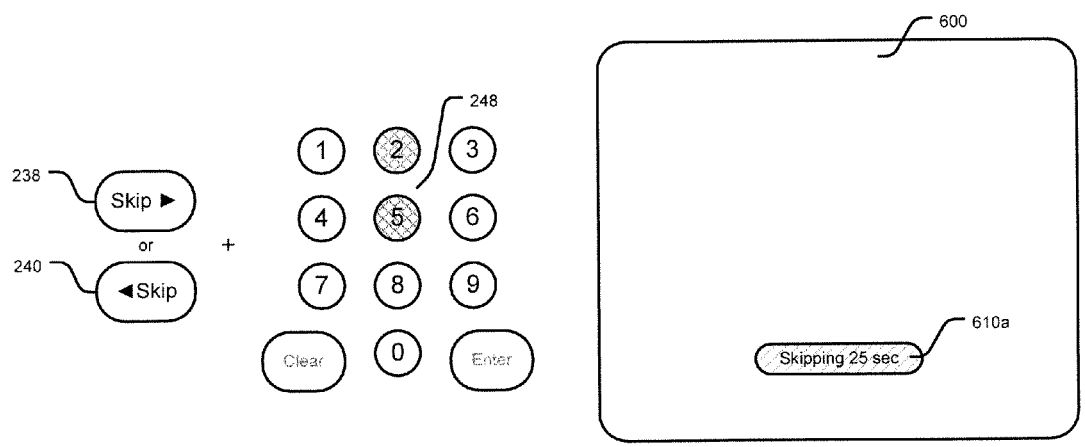
FIGS. 6A-6B depict an exemplary illustration of playback controls, according to an embodiment of the disclosure.
Figure 6B:
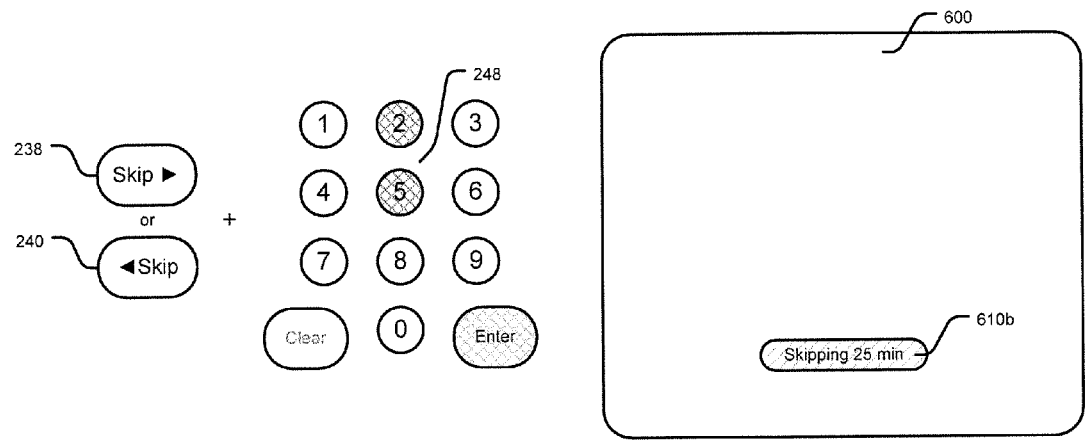

Video playback customization may also be provided by using key modifiers. FIGS. 6A-6B depicts an exemplary illustration of customizing playback controls using key modifiers, according to an embodiment of the disclosure. For example, in FIG. 6A, a viewer may begin setting the speed for a skip forward or skip back function by pressing Skip Forward 238 or Skip Back 240 to transmit an initiating command that initiates the function. This step is similar to the initiating step discussed in quick set customization. However, instead of providing a menu of predetermined speeds or a sliding bar, a user selects the amount of time to be skipped by direct entry using the numeric (or alphanumeric) keypad 248 on the remote control 110. For instance, after initiating a skip forward function by sending an initiating command to the media control station at the media box 120, a viewer may enter "2" and "5" on the keypad 248 within a predetermined amount of time. The "2" and "5" may correspond to a numerical command that informs the media box 120 to skip forward in the video stream for an amount of time, e.g., 25 seconds. In one embodiment, a skipping speed indicator 610a may be displayed over the video 600.

In another embodiment, the amount of time to be skipped may be in minutes rather than in seconds. For example, in FIG. 6B, after initiating a skip forward function (e.g., by pressing Skip Forward 238), a viewer may enter "2" and "5" into the keypad 248, followed by a minute-set button, such as Enter 250, within a predetermined amount of time. In this instance, a numerical command followed by a minute-set command may be sent to the media control station 122 at the media box 120 to skip forward the video stream by 25 minutes. In one embodiment, a skipping speed indicator 610b may be displayed over the video 600.

Figure 7A:
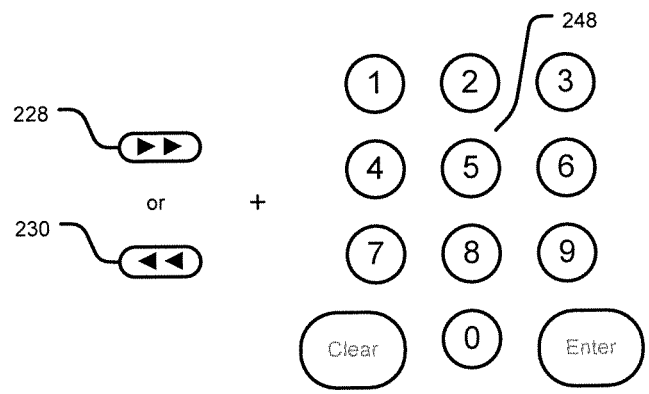
FIGS. 7A-7C depict an exemplary illustration of playback controls, according to an embodiment of the disclosure.
Figure 7B:
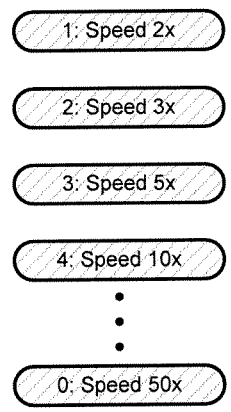
Figure 7C:
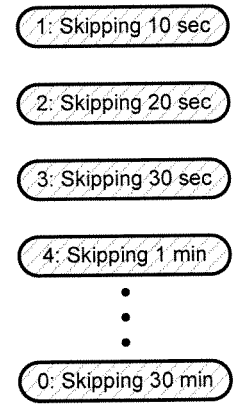

FIGS. 7A-7C depict another exemplary illustration of customization of playback controls using key modifiers, according to an embodiment of the disclosure. In FIG. 7A, a viewer may initiate a fast forward or rewind function by pressing Fast Forward 228 or Rewind 230. After initiating the function, a viewer may enter a value, e.g., "2", on the keypad 248 within a predetermined amount of time. In this example, as depicted in FIG. 7B, the value "2" may correspond to a predetermined playback speed, e.g., 3×, such that when the key is pressed and a numerical command is transmitted to the media control station at the media box 120, the function may be performed at the predetermined speed. Customization using key modifiers may apply to both the fast forwarding and the rewind functions. In another embodiment, as depicted in FIG. 7C, the customization of playback controls may also be provided for skip forward and skip back, where the skip interval may be provided as an amount of time (e.g., seconds, minutes, hours, etc.) to be skipped.

Figure 8:
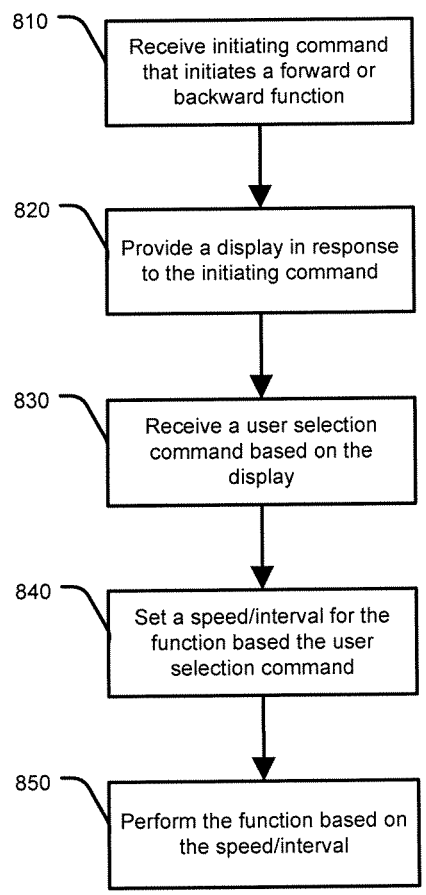
FIG. 8 depicts an exemplary flowchart of a playback controls, according to an embodiment of the disclosure.

FIG. 8 depicts an exemplary flowchart of a process for customizing playback controls 800, according to an embodiment of the disclosure. At step 810, the media control station 122 may receive an initiating command from a remote control device 110. In this example, the initiating command may initiate a forward or backward function. The forward function may include skip forward or fast forward function. The backward function may include skip back or rewind function. Other variations may also be provided. At step 820, the media control station 122 may provide a display at an output device 112 in response to the initiating command. At step 830, the media control station 122 may receive a user selection command from the remote control device 110 based on the display. At step 840, the media control station may set a speed (for the fast forward or rewind function) or an interval (for the skipping forward or back function) based on the user selection command. At step 850, the media control station 122 may perform the function based on the selected speed or interval. The display may include a menu of preset speeds, a current speed indicator, a sliding bar, or a combination thereof. The speed may be selected by arrows 218 on the remote control device 110, by an alphanumeric keypad 248 on the remote control device 110, or by another control.

Using context keys may provide another way to customize video playback. For example, a viewer may be watching a 3-hour football game on TV. He or she may have just finished watching the first half of the game and does not want to sit through the half-time show. As a result, the viewer may press the Fast Forward button 228 to initiate a fast forwarding function. By holding the button 228, the playback speed may gradually increase. When the user sees that the half-time show is over and the game is about to begin, he or she may resume video playback by releasing the Fast Forward button 228. In another embodiment, the viewer may press Play 236 to resume. In either situation, the fast forward speed right before the user desires to resume playback may be at an extremely fast rate, e.g., 400×. As a result, it is likely that due to delays in human reaction, signaling, and hardware processing, the football game may have resumed at a later frame than desired or intended by the viewer when he or she released the Fast Forward button 228 (or pressed Play 236), e.g., the viewer may have missed the amazing kickoff return at beginning of the second half.

As discussed above, if the user overshoots the position where he or she wanted to resume play (e.g., at the start of the second half of the football game), the user may correct for this overshoot by pressing Skip Forward 238 or Skip Back 240. In this example, pressing the Skip Back key 240 may initiate a skip back function by sending an initiating command to the media control station 122 at the media box 120. By pressing the Skip Back button 240, the media control station 122 may also retrieve information relating to all recent actions performed by the user and/or media control station 122. For instance, the media control station 122 may recognize from the information that the video was previously fast forwarding at 400×. As a result, one press of the Skip Back key 240 may provide correction for the overshoot by taking that information into account by skipping back by an amount of time, e.g., 4 minutes, to correct the overshoot. On the other hand, if the fast forward speed was slower (e.g., at 4×), pressing the Skip Back button 240 may correct the overshoot by a shorter amount of time, e.g., 15 seconds. Depending on what and how fast or slow the user and/or media control station 122 was previously performing a function, the media control station 122 may retrieve this information to appropriately correct for the overshoot. As a result, the interval skipped forward or backward may not be constant. Rather, the interval may depend on the "context" or previous actions, e.g. how fast the media box 120 was fast forwarding or rewinding, to correct for overshooting. If the viewer sufficiently predicts when to release the Fast Forward button 228 so that the football game resumes exactly where he or she wanted to resume, it may not be necessary for the viewer to press any additional buttons for correction.

Figure 9:
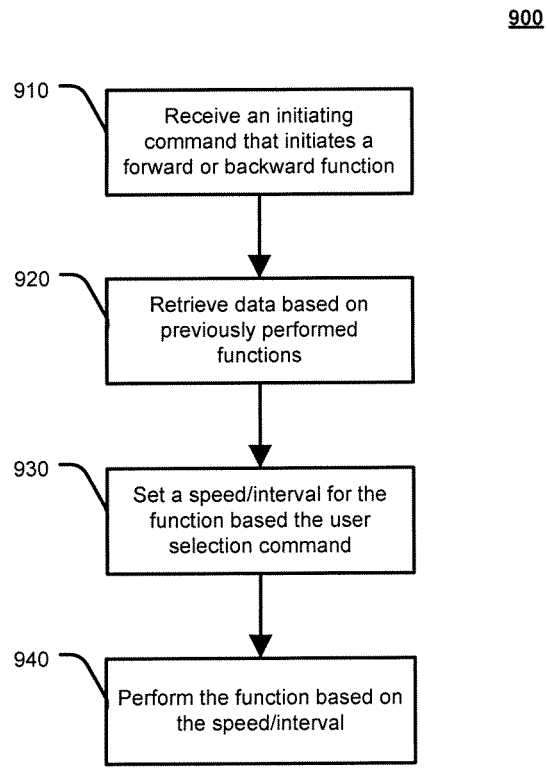
FIG. 9 depicts an exemplary flowchart of a playback controls, according to an embodiment of the disclosure.

FIG. 9 depicts an exemplary flowchart of a process for customizing playback controls 900 using context keys, according to an embodiment of the disclosure. At step 910, the media control station 122 may receive an initiating command from a remote control device 110. In this example, the initiating command may initiate a skip forward or skip back function. At step 820, the media control station 122 may retrieve data based on previously performed functions during a predetermined period of time, e.g., before receiving the initiating command. At step 830, the media control station may set an interval for the skip forward or skip back function based on the retrieved data. At step 840, the media control station 122 may perform the function based on the interval. In the event that a skip forward function is initiated, the media control station 122 may correct an overshoot of a previously performed rewind function based on the retrieved data. In the event that a skip back function is initiated, the media control station 122 may correct an overshoot of a previously performed fast forward function based on the retrieved data. In one embodiment, the retrieved data may include information relating to at least one of a previous playback speed, a previous skip interval, a user's average delay time, a user's correction history, and media type.

Context key customization may also provide adaptive correction. In one embodiment, the media control station 122 may store information specific for each user/viewer. For example, the media control station 122 may retain information relating to a user's tendencies or habits, e.g., remembering how much the user corrects (i.e., reverses or fast forwards) after he stops the fast forward or rewind function (in each speed), averaging his or her delay time based, etc., and use this information to calculate an overshoot correction tailored to this particular user. In one embodiment, calculation of the overshoot correction may include finding an average, a median, a standard deviation, and/or other similar forms of data, for each speed. Media control station 122 may also fine tune corrections based on user's extended and/or more recent history.

In another embodiment, the media control station 122 may have different overshoot corrections for different types of video programs. For example, an overshoot correction for a regular TV program may be different than an overshoot correction for a full-length movie, which may also be different from a sports or a news program. Signal 114 may provide information relating to the media control station 122 at the media box 120. The media control station 122 may categorize and store this information along with other information, such as a user's average reaction delay, correction history, etc. As a result, when a user presses the Skip Forward 238 or Skip Back 240 context key, an initiating command and a context command may be transmitted to the media control station 122 to retrieve and implement the calculated overshoot correction for the specific to the media being broadcasted.

In yet another embodiment, once the forward or backward function is performed, an optional "sticking" function may be provided to the Skip Forward 238 and/or Skip Back 240 buttons. The "sticking" feature of the buttons may allow a user to the repeat the previous function at the next press of the Skip Forward 238 or Skip Back 240 button. For example, a previously selected speed may be stored in one or more databases 124, 126 of the media box 120 and may be used for future retrieval. Thus, when a viewer who had just skipped backed 30 seconds using a quick set customization, for example, he or she may perform the same function at the next press of the Skip Back button 240. In another embodiment, the optional "sticking" feature may not be implemented. Thus, the press of the Skip Forward 238 or Skip Back 240 button may merely perform the forward or backward function at a default speed, interval, or other default setting.

Another way a user may repeat a customized forward or backward function may be by pressing the "Previous" button 216. For example, a viewer watching a television show may be entering a 3-minute commercial break. The viewer may not want to skip over the entire break because he or she may enjoy watching new commercials. As a result, when the first commercial appears, having seen the commercial before, the viewer may apply a quick set customization to skip forward 30 seconds, which is generally the duration of a single commercial, to the next commercial. The viewer may have also previously seen the second commercial as well. At this point, the viewer may press the "Previous" button 216 again to transmit an initiating and an execution command to repeat the previous function. In this way, the viewer may skip through the entire commercial break, selectively watching only those commercials he or she has not previously seen. This feature is similar to the "sticking" function; however, the previous function feature offers a user the flexibility to perform a repeat of a previous function even if the "sticking" feature is disabled. Other methods may also be provided to implement this feature, for example, if a remote control device does not possess a "Previous" button. For instance, a user may press the Skip Forward button 238, followed by the "0" button on the numerical keypad 248, or press the Skip Forward button twice in a row. The media control station 122 may be configured to recognize skipping forward "0" seconds or double-pressing the Skip Forward button 238 as performing a previous function. Other various implementations may also be provided.

Another embodiment of the disclosure may include blocking a fast forward and/or rewind function. For example, there may be certain media broadcasts that contain advertisements. These advertisements may contain data to block any a media control station 122 from performing a fast forward, rewind, skip forward, skip back, or other similar function. In this case, the media control station 122 may receive commands from a viewer but may choose to ignore any such commands. This feature may be advantageous for displaying media ratings, parental control features, anti-piracy media, and/or additional federal and state law requirements. Other various embodiments may also be provided.

While the embodiments described above may be directed to a media box 120, specifically the media control station 122, processing the video playback customizations, it should be appreciated to one of ordinary skill in the art that the remote control 110 and/or the output device 112 may include processing capabilities to customize the features described above as well.

Although the embodiments described above are directed toward DVRs and PVRs, it may be readily appreciated that one or ordinary skill in the art may apply the features and functionalities of the system and method as discussed above to any video or audio application, such as DVDs players, VCRs, CD players, MP3s players, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

The specification and drawings are accordingly to be regarded in an illustrative rather than restrictive sense.

The invention claimed is:

1. A method, comprising:
   receiving an initiating command from a remote control device, wherein the initiating command is associated with a forward function or a backward function;
   providing a display in response to the initiating command, wherein the display is a menu of predetermined customizable skip intervals configured to provide continuously variable forward and backward playback;
   receiving a user selection command based on the display;
   adjusting the forward function or the backward function based on the user selection command; and
   providing automatic overshoot correction upon resuming a normal playback, wherein the automatic overshoot correction is based on at least one of an average user reaction delay, correction history, type of multimedia, or context of user-initiated command.

2. The method of claim 1, wherein the predetermined customizable skip intervals have a forward and backward playback range of 0.25× to 400×.

3. The method of claim 1, wherein the continuously variable forward and backward playback is adjustable during playback by user selection to fine tune playback control.

4. The method of claim 1, wherein the display is a current speed indicator or a current interval indicator.

5. The method of claim 1, wherein the display is sliding bar.

6. The method of claim 1, wherein adjusting the forward function or the backward function comprises setting a speed or skip interval for the forward function or the backward function.

7. The method of claim 6, wherein the speed or skip interval is selected by arrows on the remote control device.

8. The method of claim 6, wherein the speed or skip interval is selected by an alphanumeric keypad on the remote control device.

9. A non-transitory computer readable medium comprising code which when executed causes a computer to perform the method of claim 1.

10. A system, comprising:
    a remote control device;
    an output device; and
    a media control station configured to:
    receive an initiating command from the remote control device to initiate a forward function or a backward function,
    provide a display at the output device in response to the initiating command, wherein the display is a menu of predetermined customizable skip intervals configured to provide continuously variable forward and backward playback,
    receive a user selection command based on the display, set a speed or skip interval for the forward function or the backward function based on the user selection command,
    perform the forward function or the backward function based on the speed or skip interval, and
    provide automatic overshoot correction upon resuming a normal playback, wherein the automatic overshoot correction is based on at least one of an average user reaction delay, correction history, type of multimedia, or context of user-initiated command.

11. A method, comprising:
    receiving an initiating command from a remote control device, wherein the initiating command is associated with a skip function;

retrieving data based on previously performed functions during a predetermined period of time;

adjusting the skip function based on the retrieved data to provide continuously variable forward and backward playback; and providing automatic overshoot correction upon resuming a normal playback, wherein the automatic overshoot correction is based on at least one of an average user reaction delay, correction history, type of multimedia, or context of user-initiated command.

12. The method of claim 11, wherein the skip function is a skip forward function that corrects an overshoot of a previously performed rewind function based on the retrieved data.

13. The method of claim 12, wherein the retrieved data comprises information relating to at least one of a previous playback speed, a previous skip interval, a user's average delay time, a user's correction history, or media type.

14. The method of claim 11, wherein the skip function is a skip back function that corrects an overshoot of a previously performed fast forward function based on the retrieved data.

15. The method of claim 14, wherein the retrieved data comprises information relating to at least one of a previous playback speed, a previous skip interval, a user's average delay time, a user's correction history, or media type.

16. The method of claim 11, wherein the skip function repeats a previously performed function.

17. A non-transitory computer readable medium comprising code which when executed causes a computer to perform the method of claim 11.

18. A system, comprising:
a monitor control station configured to:
receive an initiating command from a remote control device, retrieve data based on previously performed functions during a predetermined period of time from one or more databases, set a skip interval for a function based on the retrieved data, perform the function based on the skip interval, and provide automatic overshoot correction upon resuming a normal playback, wherein the automatic overshoot correction is based on at least one of an average user reaction delay, correction history, type of multimedia, or context of user-initiated command;

wherein the initiating command initiates a forward function or a backward function, and wherein the skip interval is customizable and configured to provide continuously variable forward and backward playback.

19. A method, comprising:

transmitting an initiating command to a device that provides a display at an output device in response to the initiating command; and transmitting a user selection command based on the display to set a forward function or a backward function to be performed at the device;

wherein the initiating command is associated with the forward function or the backward function, and wherein a skip interval is customizable and configured to provide continuously variable forward and backward playback, and automatically corrects skip interval overshooting based on at least one of an average user reaction delay, correction history, type of multimedia, or context of user-initiated command.

* * * * *